(12) United States Patent
Lacouture et al.

(10) Patent No.: US 9,724,887 B2
(45) Date of Patent: Aug. 8, 2017

(54) METHOD FOR PRODUCING A TIRE CARCASS PLY

(75) Inventors: Guy Lacouture, Clermont-Ferrand (FR); Nicolas Perrichot, Clermont-Ferrand (FR); Philippe Vilmus, Clermont-Ferrand (FR); Rémi Herbreteau, Clermont-Ferrand (FR)

(73) Assignees: COMPAGNIE GENERALE DES ETABLISSEMENTS MICHELIN, Clermont-Ferrand (FR); MICHELIN RECHERCHE ET TECHNIQUE S.A., Granges-Paccot (CH)

( * ) Notice: Subject to any disclaimer, the term of this patent is extended or adjusted under 35 U.S.C. 154(b) by 0 days.

(21) Appl. No.: 14/116,716

(22) PCT Filed: May 7, 2012

(86) PCT No.: PCT/FR2012/051010
§ 371 (c)(1),
(2), (4) Date: Jan. 27, 2014

(87) PCT Pub. No.: WO2012/153055
PCT Pub. Date: Nov. 15, 2012

(65) Prior Publication Data
US 2014/0130959 A1    May 15, 2014

(30) Foreign Application Priority Data
May 10, 2011    (FR) ...................... 11 54007

(51) Int. Cl.
*B29D 30/30* (2006.01)
*B29D 30/42* (2006.01)
(Continued)

(52) U.S. Cl.
CPC .............. *B29D 30/30* (2013.01); *B29C 65/56* (2013.01); *B29C 65/7802* (2013.01);
(Continued)

(58) Field of Classification Search
CPC .... B29D 30/3007; B29D 30/42; B29D 30/70; B29D 2030/422; B29D 2030/423;
(Continued)

(56) References Cited

U.S. PATENT DOCUMENTS 3,922,188 A * 11/1975 Appleby ................ B29D 30/26
156/123
4,088,527 A    5/1978 Murase et al.
(Continued)

FOREIGN PATENT DOCUMENTS

| CN | 1411979 A | 4/2003 |
|---|---|---|
| CN | 1833858 A | 9/2006 |
| GB | 2318082 A | 4/1998 |

OTHER PUBLICATIONS

Chinese Office Action on copending Application 201280022207.8 dated Feb. 16, 2015.
(Continued)

*Primary Examiner* — Martin Rogers
(74) *Attorney, Agent, or Firm* — Dickinson Wright PLLC

(57) ABSTRACT

In the method for producing a tire carcass ply for a vehicle, the ply is wound onto a drum and contains reinforcements running in planes that are radial to an axis of the drum, of which:
at least one assembly member (51, 52) mounted such that it can move in relation to the drum brings the ends of the ply together and assembles them by travelling over the ply in a direction (X) parallel to the ends; and
prior to assembly, a blade independent of the one or of each assembly member extends between the drum and the ends without extending between the drum and the rest of the ply.

7 Claims, 11 Drawing Sheets

(51) Int. Cl.
  *B29C 65/78* (2006.01)
  *B29C 65/00* (2006.01)
  *B29D 30/24* (2006.01)
  *B29C 65/56* (2006.01)
  *B29L 30/00* (2006.01)
  *B29C 53/42* (2006.01)

(52) U.S. Cl.
  CPC ........ *B29C 65/785* (2013.01); *B29C 66/1142* (2013.01); *B29C 66/4322* (2013.01); *B29C 66/49* (2013.01); *B29C 66/71* (2013.01); *B29C 66/72141* (2013.01); *B29C 66/81433* (2013.01); *B29C 66/81435* (2013.01); *B29C 66/81469* (2013.01); *B29C 66/8362* (2013.01); *B29D 30/245* (2013.01); *B29D 30/42* (2013.01); *B29C 53/42* (2013.01); *B29C 66/7212* (2013.01); *B29D 30/3007* (2013.01); *B29D 2030/422* (2013.01); *B29D 2030/427* (2013.01); *B29L 2030/00* (2013.01)

(58) Field of Classification Search
  CPC ........ B29D 2030/424; B29D 2030/425; B29D 2030/426; B29D 2030/427; B29D 2030/705
  See application file for complete search history.

(56) References Cited

U.S. PATENT DOCUMENTS

| | | | |
|---|---|---|---|
| 4,793,890 A | 12/1988 | Sato | |
| 4,867,823 A | 9/1989 | Pizzorno | |
| 5,228,941 A * | 7/1993 | Panicali | B29C 66/71 156/304.1 |
| 5,348,600 A * | 9/1994 | Ishii | B29C 53/42 156/134 |
| 6,533,891 B1 | 3/2003 | Kubinski | |
| 2003/0070742 A1 | 4/2003 | Risser | |
| 2006/0137804 A1 | 6/2006 | Downing | |
| 2008/0017297 A1* | 1/2008 | Tanaka et al. | B29C 65/004 156/110.1 |
| 2010/0139467 A1* | 6/2010 | Gutknecht et al. | B26D 1/20 83/72 |
| 2010/0212836 A1 | 8/2010 | Tachibana et al. | |

OTHER PUBLICATIONS

PCT/FR2012/051010, International Search Report (English translation included), dated Sep. 13, 2012, 3 pages.
PCT/FR2012/051010, Translation of the PCT Written Opinion of the ISR (Form PCT/ISA/237), 5 pages.

* cited by examiner

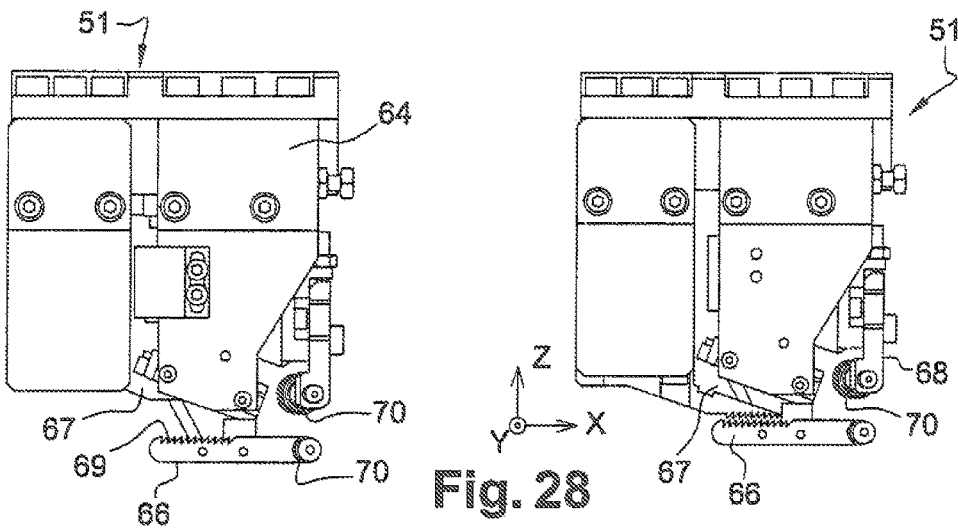
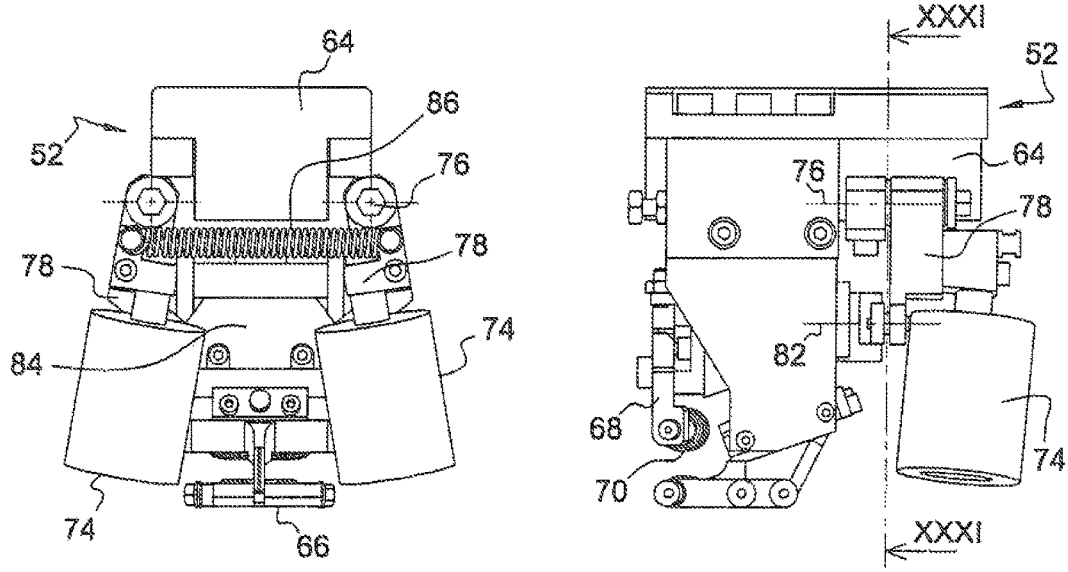
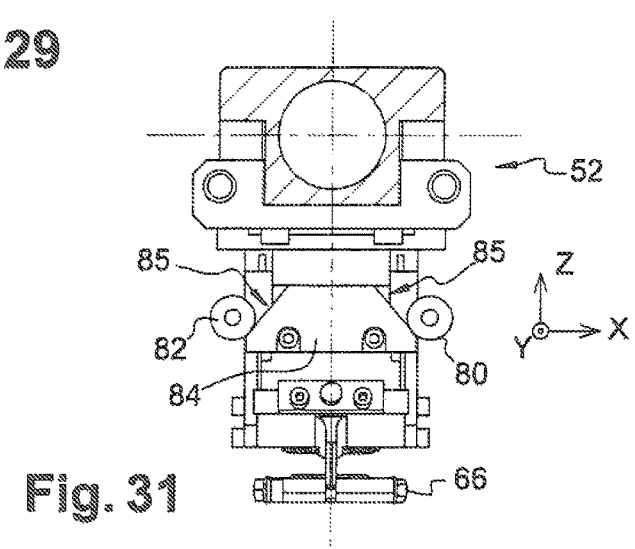

METHOD FOR PRODUCING A TIRE CARCASS PLY

This application claims benefit of the filing date of PCT/FR2012/051010, filed May 7, 2012, which claims the benefit of FR1154007, filed May 10, 2011, the entire contents of each of which are incorporated herein by reference for all purposes.

BACKGROUND

1. Field

The invention relates to vehicle tires.

2. Description of Related Art

A tire of the radial type, in particular when it is intended for a heavy goods vehicle, generally comprises a component part known as a carcass ply. It is formed from a rubber matrix reinforced by strands constituted by plaited metal threads, each extending in a plane radial to the axis of the tire. The strands are arranged in a single layer after one another. The distance separating the successive strands is constant. This constituent part is one of those which form the basis for the architecture of a tire of the radial type.

During the manufacture of the tire, the carcass ply, initially in a flat configuration, is wound onto a drum on which it adopts an annular shape. An operator then attaches the two ends of the ply manually to one another, in such a way that this attachment is transparent with regard to the quality and the performance of the tire. In other words, the strands situated at the ends must be separated from one another by a distance identical to that separating the other strands, in order for this distance to remain constant over the entire circumference of the tire.

SUMMARY

One objective of the disclosure is to automate the production of the carcass ply.

For this purpose, a method for producing a vehicle tire carcass ply is proposed according to an embodiment of the invention, in which method, the ply being wound onto a drum and containing reinforcements extending in planes that are radial to an axis of the drum, at least one assembly member, mounted in such a way that it is able to move in relation to the drum, brings ends of the ply together and assembles them by travelling over the ply in a direction parallel to the ends, and in which method, prior to assembly, a blade independent of the one or each assembly member extends between the drum and the ends without extending between the drum and the rest of the ply.

The member thus assembles the ends in a progressive manner by travelling over them longitudinally. The method provides automated and reliable butt-jointing of the ends, thereby ensuring their secure attachment to one another and compliance with the dimensional imperatives.

In addition, the blade permits the introduction of the assembly member into the space situated between the ply and the drum without forcing it and without the risk of damaging the ply. It should be recalled that the rubber of the ply is still in the plastic and non-elastic state at this stage and, as such, is easily deformable and alterable.

Advantageously, the blade is arranged on the drum, and the ply is wound onto the blade and the drum.

This is a particularly simple way of achieving the interposition of the blade between the ply and the drum.

Preferably, the blade is introduced in a direction circumferential to the axis of the drum between the drum and one end of the ply wound onto the drum.

Advantageously, prior to assembly, the ends are moved away from the drum, in particular from the blade, in a direction radial to the axis of the drum by means that are separate from the one or from each assembly member.

The positioning of the assembly member in relation to the ply is facilitated in this way, and the generation of stresses in the ply that are likely to deform it is avoided.

Advantageously, during assembly, the ends are retained at a distance from the drum, in particular from the blade, in a direction radial to the axis of the drum, by means that are separate from the one or from each assembly member.

This retention facilitates the action of the assembly member, in particular its displacement, which can take place at a distance from the drum, and avoids the generation of stresses in the ply.

The retention is preferably effected by means of at least one magnet, and the one or each magnet which ensures the retention is displaced in order to make clearance available providing access to the assembly member for the ends.

Where appropriate, advantage is thus taken of the fact that the ply contains metallic reinforcements which are able to interact with the magnet. The clearance prevents damage to the ply by friction when in contact with the magnet.

The assembly members are preferably two in number, and one of them is stationary in relation to the drum and retains the ply while the other carries out the assembly.

The retention of the ply by one of the members thus facilitates the assembly of the ends by the other.

The assembly member or one of the assembly members preferably travels over the ply during assembly:

from a first position in a first direction as far as a second position, and from a third position, situated between the first and second positions, in a second direction as far as a fourth position, in such a way that the first position extends between the third and fourth positions.

Each of the members thus carries out a fraction of the assembly on different portions of the ends and in different directions, which makes it possible to avoid the appearance of deformations in the ply by balancing out the stresses which are generated there.

Preferably, during assembly, the assembly member or one of the assembly members travels over the ply:

from the second position as far as one distal edge of the ends, and from the fourth position as far as one proximal edge of the ends.

Also proposed according to the invention is a method for producing a tire which implements a method according to the invention.

Also proposed according to the invention is a device for manufacturing a vehicle tire carcass ply, which device comprises a drum, at least one assembly member comprising at least one pair of ribbed rollers mounted so as to rotate about respective intersecting axes defining a plane parallel to the axis of the drum, means capable of guiding the assembly member in a sliding manner in relation to the drum parallel to one axis of the drum and a blade movably mounted in relation to the drum independently of the one or each assembly member.

This device permits the implementation of the method of the invention.

Advantageously, the blade has a concave surface exhibiting a curvature identical to a curvature of the drum.

It is thus possible to apply the blade against the external surface of the drum.

The blade preferably exhibits a base surface and at least one supporting surface, both of which are oriented in the opposite direction to the axis, the supporting surface being situated further away from the axis than the base surface.

The one or more supporting surfaces permit the blade to support the ends of the ply at a distance from the base surface, in order to facilitate the introduction of the assembly members beneath the ply.

The supporting surface advantageously exhibits a common edge with the concave surface.

The blade is thus easily introduced in the direction circumferential to the axis of the drum between the drum and one end of the ply wound onto the drum.

The blade preferably comprises at least one member rotatably mounted on a base of the blade and forming the supporting surface or one of the supporting surfaces.

One such member rolls against the ply during winding of the ply onto the drum and thus supports it without the risk of damaging it.

Advantageously, the supporting surfaces are two in number and are separated from one another by a free space in a direction circumferential to the axis.

This space facilitates the introduction of the assembly members beneath the ply.

The device preferably comprises means, separate from the one or from each assembly member, for distancing the ends of a carcass ply wound onto the drum in relation to the drum, in particular in relation to the blade, in a direction radial to the axis.

In one embodiment, the means of distancing comprise means for blowing air, in particular from the blade.

It is thus easy to distance the ends of the ply with regard to the drum, or to the blade. This avoids the need to increase the capacity of any magnets, so that any stress generated by them once the ends are in a raised position does not give rise to deformation or to unnecessary friction in the ply.

Advantageously, the device comprises means, separate from the one or from each assembly member, to retain the ends of a carcass ply wound onto the drum at a distance from the drum, in particular from the blade, in a direction radial to the axis.

In one embodiment, the means of distancing and/or of retention comprise at least one magnet.

Advantageously, the one or each magnet is carried by the assembly member or by one of the assembly members.

The magnet thus assures the retention of the ends in the raised position in the vicinity of the assembly member regardless of the position of the latter in the course of its movement.

Preferably, the one or each magnet is mounted in such a way that it is capable of movement in relation to a body of the assembly member between a first position and a second position further away from the ribbed rollers than the first position.

It is thus possible to make provision, in the first position, for the magnets to be capable of influencing the ends in order to cause them to complete their distancing path, whereas, in the second position, they simply permit these ends to be maintained in the raised position. In the second position, the magnets make access to the ends of the ply available for the assembly member. It is thus possible to avoid generating friction between the ply and the magnets at the time of closure.

The device can also exhibit at least any one of the following characterizing features:

the pairs of ribbed rollers are two in number in the one or each assembly member and extend with regard to one another, preferably by being movably mounted in relation to one another;

the assembly members are at least two in number and are movably mounted in relation to the drum parallel to the axis independently of one another; and the assembly member or one at least of the assembly members comprises two jaws separate from the ribbed rollers.

BRIEF DESCRIPTION OF DRAWINGS

Other characterizing features and advantages of the invention will also be appreciated from the following description of an embodiment provided by way of non-limiting example with reference to the accompanying drawings, in which:

FIG. 28 exhibits two states of one of the assembly members of the device depicted in FIG. 4;

FIGS. 29 to 31 are views from the front, from the side and in cross-section in the plane XXXI-XXXI of the other assembly member of the device depicted in FIG. 4.

DETAILED DESCRIPTION OF SPECIFIC EMBODIMENTS

Figure 1:
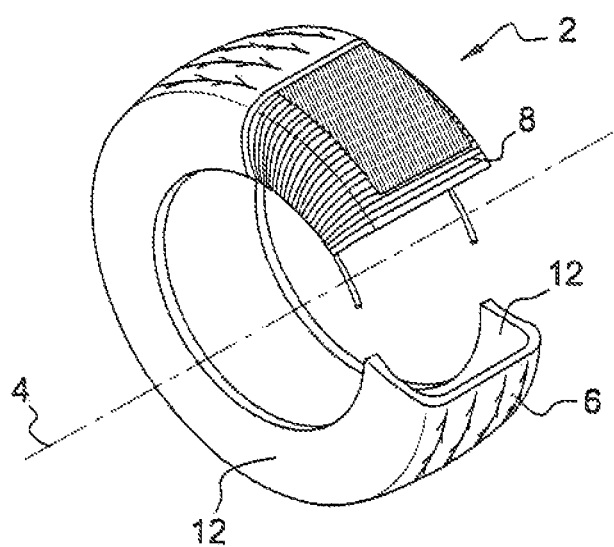
FIG. 1 is a perspective view with a partial cut-away of a tire manufactured by means of the method of the invention.

Illustrated in FIG. 1 is a tire 2 of the radial type for a vehicle wheel. The vehicle is preferably a vehicle of the heavy goods type. Nevertheless, the invention is also applicable to tires for lightweight vehicles, for passenger vehicles, for utility vehicles, or even to tires for civil engineering plant and equipment.

The tire exhibits an annular form with reference to a principal axis 4 of the tire. It comprises in particular a tread 6 of generally cylindrical form and a carcass ply 8, which is also illustrated in cross-section in FIGS. 2 and 3. This ply comprises strands 10 formed in the present case by plaited metal wires. The ply comprises a rubber matrix 14, in which the strands are embedded, and which forms the surfaces of the ply. Within the tire, the strands 10 extend in respectively radial planes with reference to the axis 4. The ply and each strand extend in the tread as well as in the sidewalls 12 of the tire, each strand having a "U"-shaped form. Once the manufacture of the tire is complete, as illustrated in FIG. 1, the carcass ply is embedded in the material of the tire without appearing on the external and internal surfaces of the latter.

Figure 2:
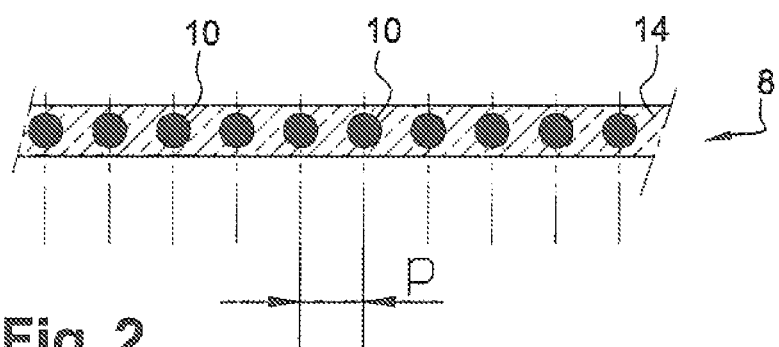
FIG. 2 is a partially sectioned view of a part of the ply of the tire depicted in FIG. 1.
Figure 3:
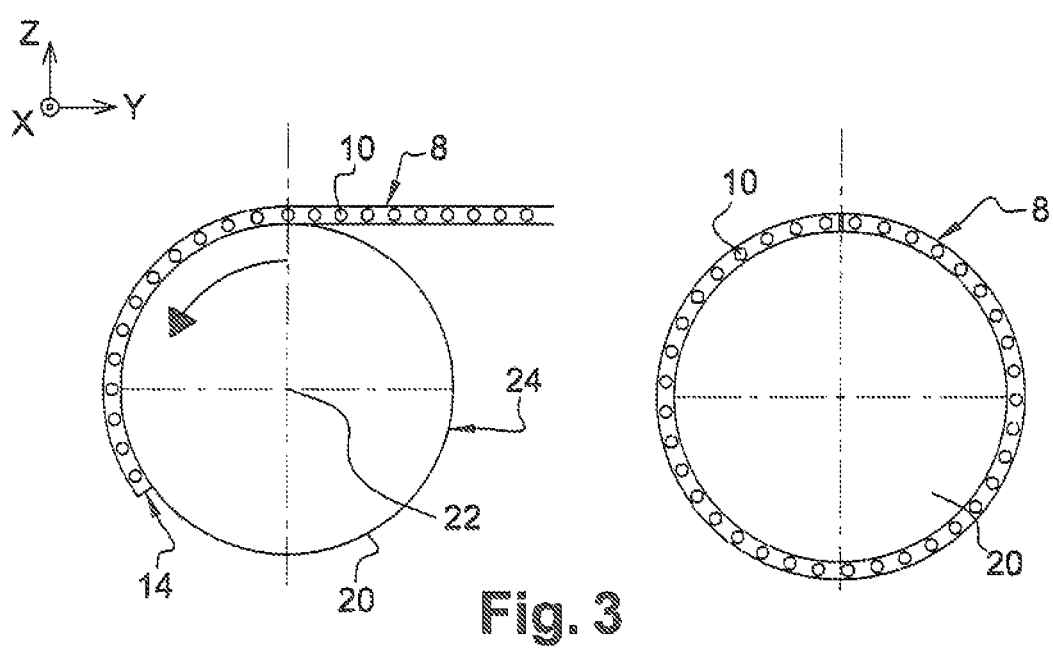
FIG. 3 is a view illustrating the principle of winding the ply onto the drum.

In the course of manufacturing the tire, the ply is present, as illustrated in FIGS. 2 and 3, in the form of a deformable strip, the rubber of the matrix 14 still being in the plastic state and not in the elastic state that it will achieve after vulcanization. As illustrated in FIG. 2, when the ply 8 is arranged on a support plane, the strands 10 are in a rectilinear configuration and extend parallel to one another in a single plane parallel to the surfaces of the ply. The distance between the axes of the successive strands is a constant, which corresponds to one pitch p. The ply 8 exhibits two longitudinal ends 14 that are rectilinear and parallel to the strands. The ply exhibits a rectangular form in plan view.

An orthogonal system of reference points X, Y, Z is defined in the present case, in which the directions X and V are horizontal and the direction Z is vertical, being oriented upwards in the positive direction.

Figure 12:
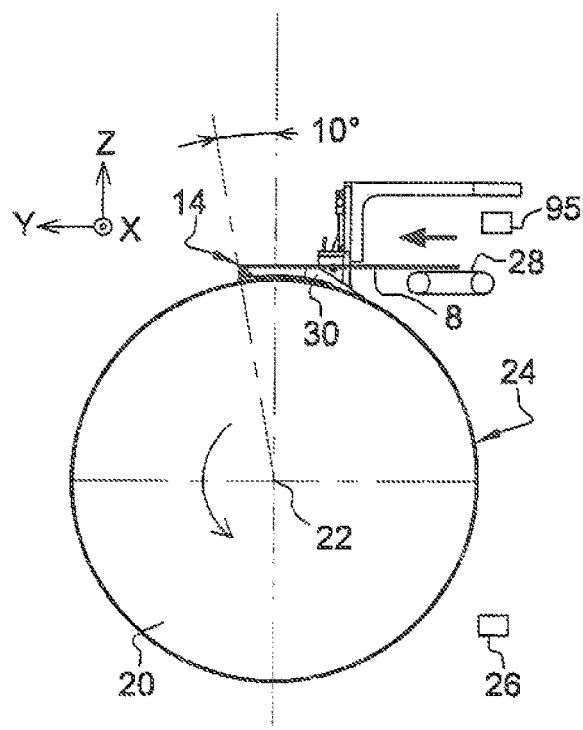
FIGS. 12 to 14 illustrate three respective stages in the winding of the ply onto the drum in the method of the invention.
Figure 13:
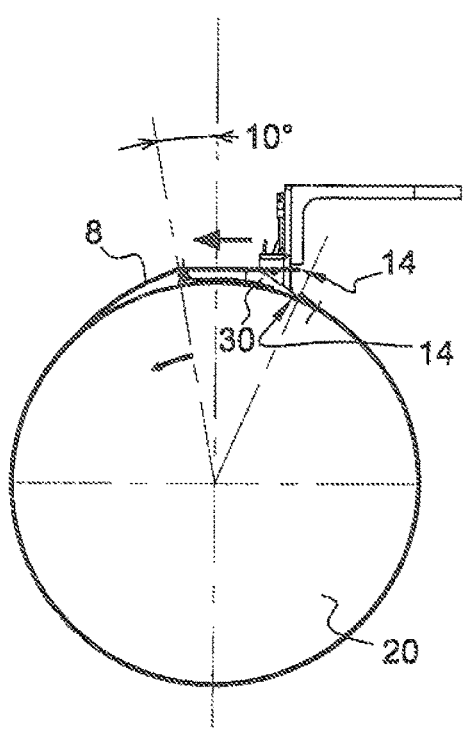
Figure 14:
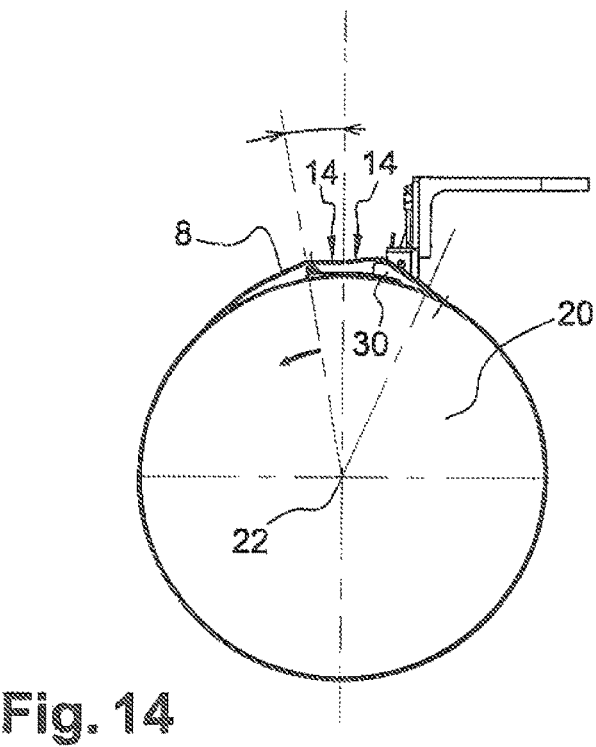

The manufacturing device 16 of the present embodiment is illustrated in particular in FIGS. 4 to 7. It comprises a frame 18 and a drum 20 having a horizontal axis 22 mounted in such a way that it is able to move in rotation in relation to the frame about the axis 22. The axis 22 is parallel to the direction X. The drum exhibits an external cylindrical surface 24 having a circular section in a plane perpendicular to the axis 22 and intended to receive the ply 8. The device 16 comprises a motor 26 capable of driving the drum in rotation about its axis and means for bringing the ply 8 as far as the drum with a view to its winding onto the latter. These means, which are not illustrated in detail and are familiar per se, in the present case include a delivery belt 28. They are arranged in such a way that the ply is brought onto the drum by extending in a plane parallel to a plane tangent to the drum, the strands 10 being parallel to the axis 22. The belt 28 and the motor 26 are controlled in such a way that the tangential speed imparted by the belt to the ply is equal to the linear speed at the surface of the drum, so that the ply is wound onto the drum as illustrated in FIGS. 12 to 14 without being subjected to stress due to stretching or compression. As illustrated in FIG. 3, the ply is wound in such a way that the strands extend parallel to the axis 22 and that, at the end of the winding process, the two ends 14 extend with regard to one another and parallel to one another.

Figure 4:
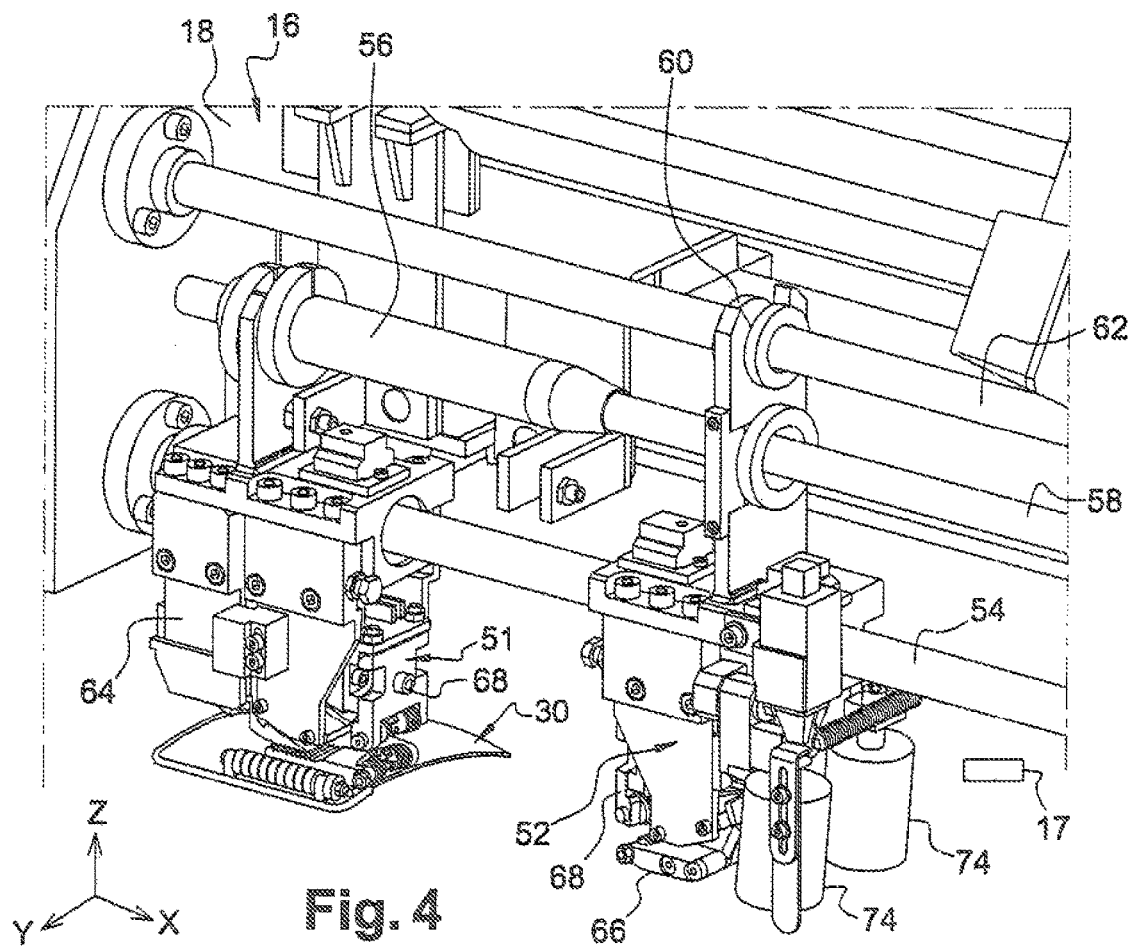
FIGS. 4 to 6 are perspective views of the device of the present embodiment of the invention.
Figure 5:
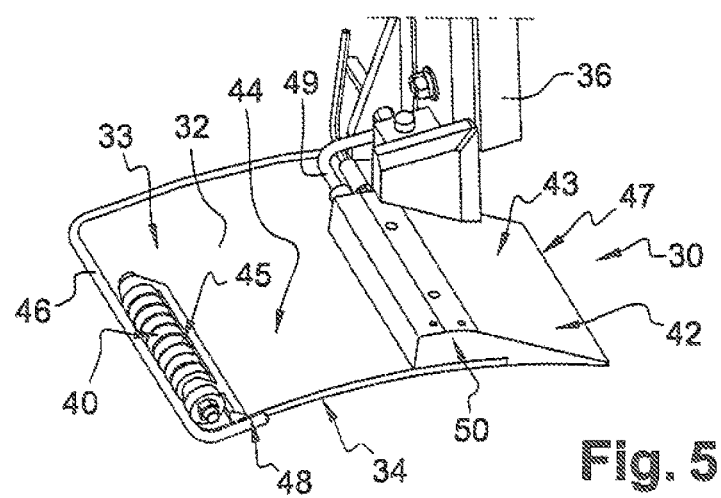

The device 16 comprises a blade 30, illustrated in particular in FIGS. 4 and 5, movably mounted in relation to the frame, in particular by means of a leg 36, and being capable of being interposed in the radial direction between the drum 24 and the ply 8 at the ends of the latter. As illustrated in FIGS. 8 to 11, the blade 30 is mounted in a sliding manner in relation to the frame in the directions X and Z by suitable means of attachment.

The blade 30 comprises a body 32 formed here by a sole plate having the form of a sector of a cylinder, and of which the lower surface 34, oriented in the direction of the axis 22, is concave. The latter exhibits a circular section in a plane perpendicular to the axis of the cylinder, of which the radius of curvature is identical to that of the external surface 24 of the drum, in such a way that the sole plate may be applied coaxially to the drum with the surfaces 34 and 24 in surface contact.

The blade 30 comprises two supports for the ends of the ply, protruding from an upper surface 33 of the body of the blade in a direction radial to the axis 22.

A first support 40 is formed at one circumferential end of the sole plate 32 by a member rotatably mounted in relation to the body and formed in the present case by a row of wheels or coaxial rollers, of which the axis is parallel to the axis 22. The rollers are mounted loosely about this axis. This member exhibits an external cylindrical surface 45 forming a supporting surface for the ply. The supporting surface 45 is situated further away from the axis than the upper surface, the upper surface and a part of the surface 45 being oriented in a direction opposite to the axis 22.

A second support 42 is formed at the other circumferential end of the sole plate by a profiled ramp or step in the direction X and exhibiting a generally triangular form in a plane perpendicular to the axis 22. The step exhibits a shoulder initiating its lower surface and into which an end section of the sole plate is inserted, the step continuing beyond the sole plate in the continuation of the surface 34 as a cylindrical facet. The height of the step increases steadily as travel takes place over the latter in a circumferential direction from its free end edge 47 as far as its edge situated in a median zone of the sole plate. This support 42 exhibits a supporting surface 43 for the ply, however, which surface has a common edge with the concave surface of the blade at a circumferential edge of the latter. The upper surface 33 and the supporting surface 43 both being oriented in a direction opposite to the axis, the supporting surface is situated further away from the axis than the upper surface.

A throat or a passage 44 is arranged above the sole plate between the supports 40 and 42, in the direction X. This free space separates the supporting surfaces 43 and 45 from one another in a direction circumferential to the axis. The blade in the present case in addition comprises means for blowing air towards the top in the direction Z. The means in this case comprise a conduit 46 descending to the leg 36, running along one rear edge and one circumferential end edge of the sole plate and folded back on a part of a front edge of the latter, from where there emerges an orifice 48 for blowing air. Similarly, another conduit 49 descends from the leg 36 and feeds, via a cavity of the support 42, another orifice 50 arranged in an upper surface of the latter.

Figure 8:
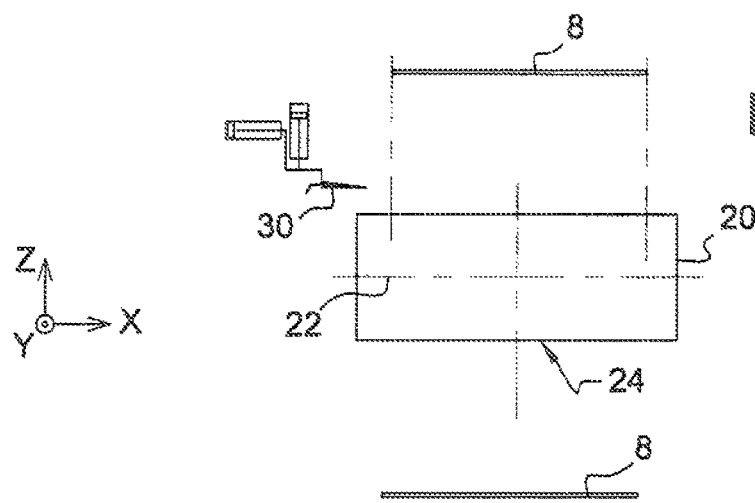
FIGS. 8 to 11 illustrate three stages in the positioning of the blade on the drum during implementation of the method.
Figure 9:
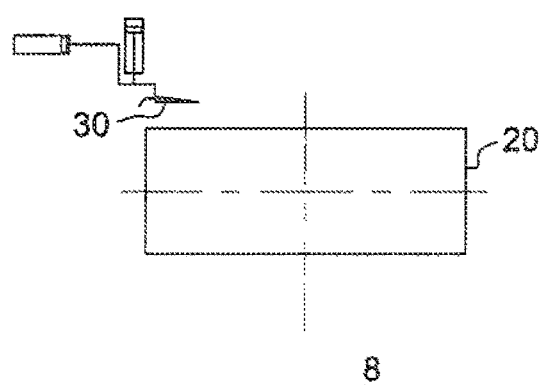
Figure 10:
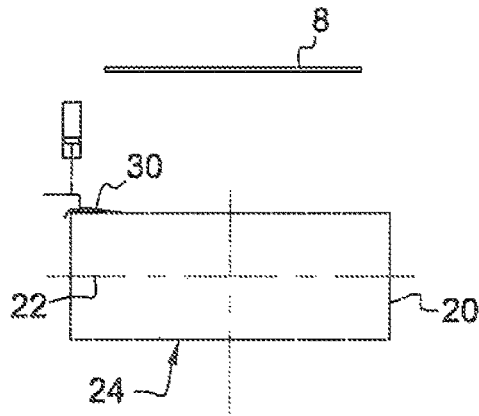
Figure 11:
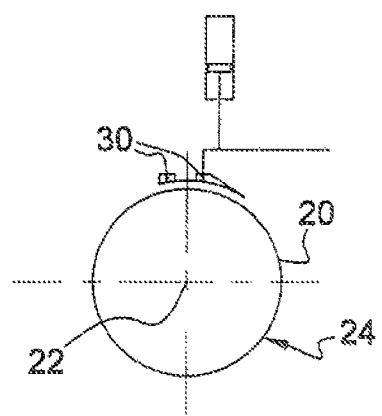

At the time of implementation of the method, and before the arrival of the ply 8 on the drum 20, the means for controlling the device displace the blade from its position illustrated in FIG. 8. In this position, it is retracted in relation to the drum in the direction X and is raised in relation to the latter in the direction Z. The means control the blade in such a way that it slides initially in the direction X before adopting a position with regard to the lateral surface 24 of the drum, as illustrated in FIG. 9. These same means then control its sliding in the direction Z radial to the axis, in such a way as to place the lower surface 34 of the sole plate in contact with the surface 24, as shown in FIG. 10. From this position, these same means finally control a slight raising of the blade by a few millimeters or a few tenths of a millimeter by sliding in the direction Z for the purpose of causing it to lift from the surface 24, as illustrated in FIG. 11. The blade at this stage thus occupies a position in which it extends with regard to the surface 24 above of the drum but at a distance from the latter.

Provision can be made, prior to these displacements of the blade, for the device 16 to control an adjustment of the angular orientation and/or of the position of the drum in relation to the frame in order to take account of specific dimensional properties of the tire and of the carcass ply associated therewith.

The means of controlling the device 16 then control the arrival of the ply 8 from the belt 28, in such a way that the ply is wound progressively around the drum coaxially with the latter, as illustrated in FIGS. 12 to 14.

This control is such that the ply 8 arrives in contact with the surface 24 of the drum at a speed equal to the linear speed imparted to the drum by the motor 26. In the course of its movement, as illustrated in FIG. 12, the ply 8 first covers the blade 30 by first passing above the support 42 and then the support 40. One end of the ply comes into contact with the surface 24, in such a way that the ply is wound onto the drum as it rotates. In the course of this movement, the ply is supported by the surface 45 of the wheels 40, which thus turn against the internal surface of the ply without damaging it.

This rotation takes place, for example, through an angle of 350°. In view of the fact that the blade remains fixed in relation to the frame, and that the drum rotates as it drives the ply, the front end 14 of the latter arrives at the support 42 on which it slides and rises in order finally to reach the throat 44. The shape of the edge 47 facilitates the introduction of the blade, in a direction circumferential to the axis 22, between the drum and the end of the ply wound onto the drum, in order to cause it to rise on the blade, the surface 43 thereby forming a ramp.

Figure 15:
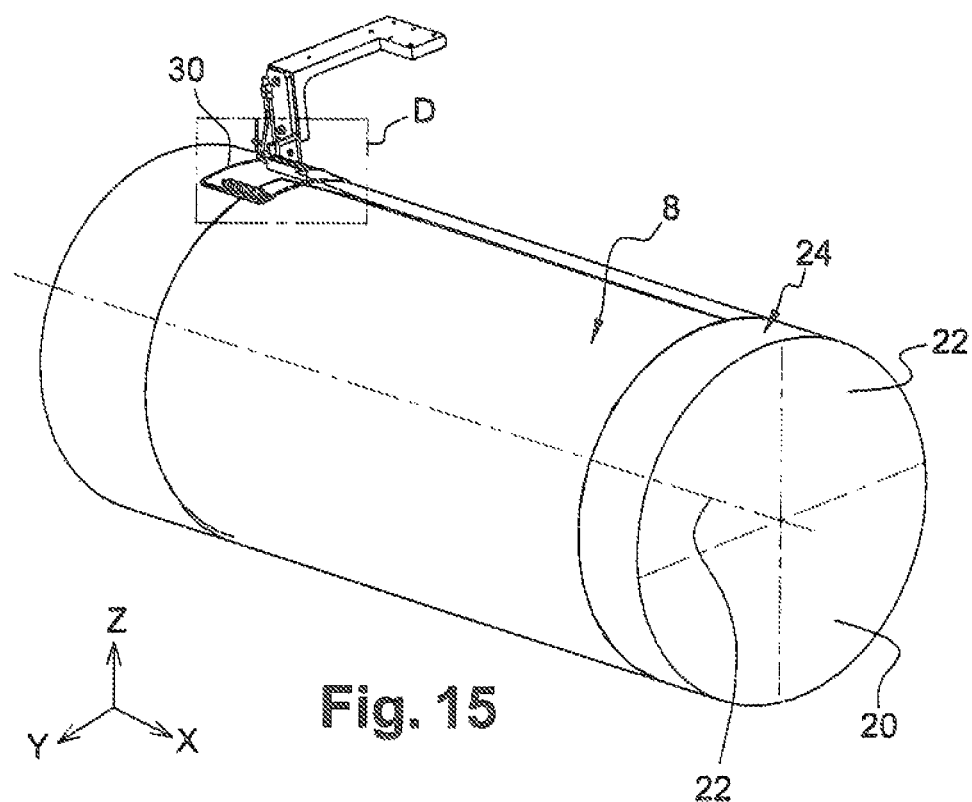
FIG. 15 is a perspective view of the ply illustrated in FIG. 14 on the drum.
Figure 16:
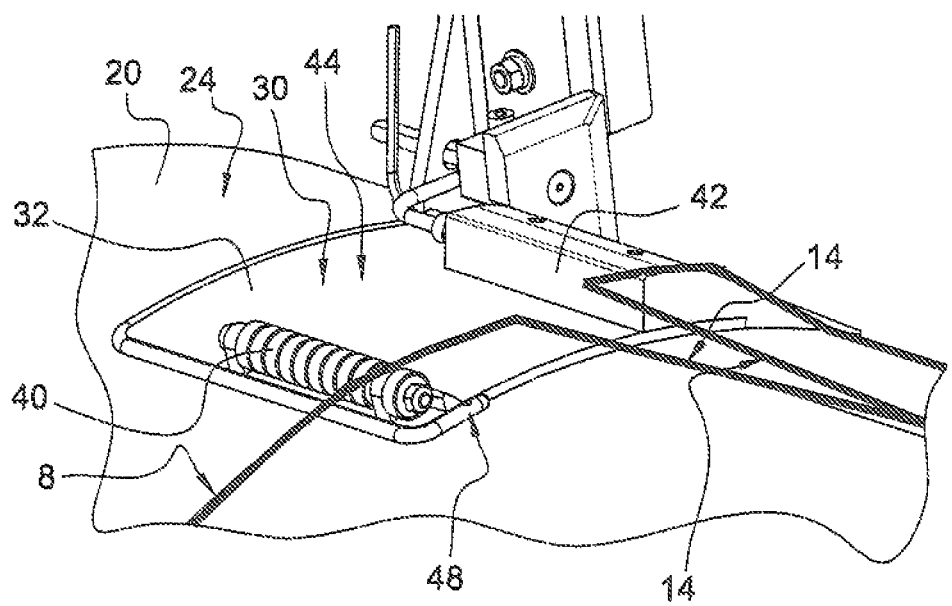
FIG. 16 is a view on a larger scale of the detail D depicted in FIG. 15.

As illustrated in FIG. 14, on completion of the positioning of the ply on the drum, the ends 14 extend at a distance from one another and with regard to one another above the throat 44, with one sector of the end of the ply supported by the support 42 and the other by the support 40. Two corners of the ends of the ply are thus elevated to the extent that the blade is interposed radially with reference to the axis 22 between the ply and the drum and on a level with them. As illustrated in FIGS. 15 and 16, this supporting of the ply by the blade takes place only over a fraction of the length of the ends in the direction X. For the whole of the rest of this length, which accounts for its largest part, and as on the rest of the ply, the ply is directly in contact with the surface 24 of the drum with which it is in surface contact.

Figure 7:
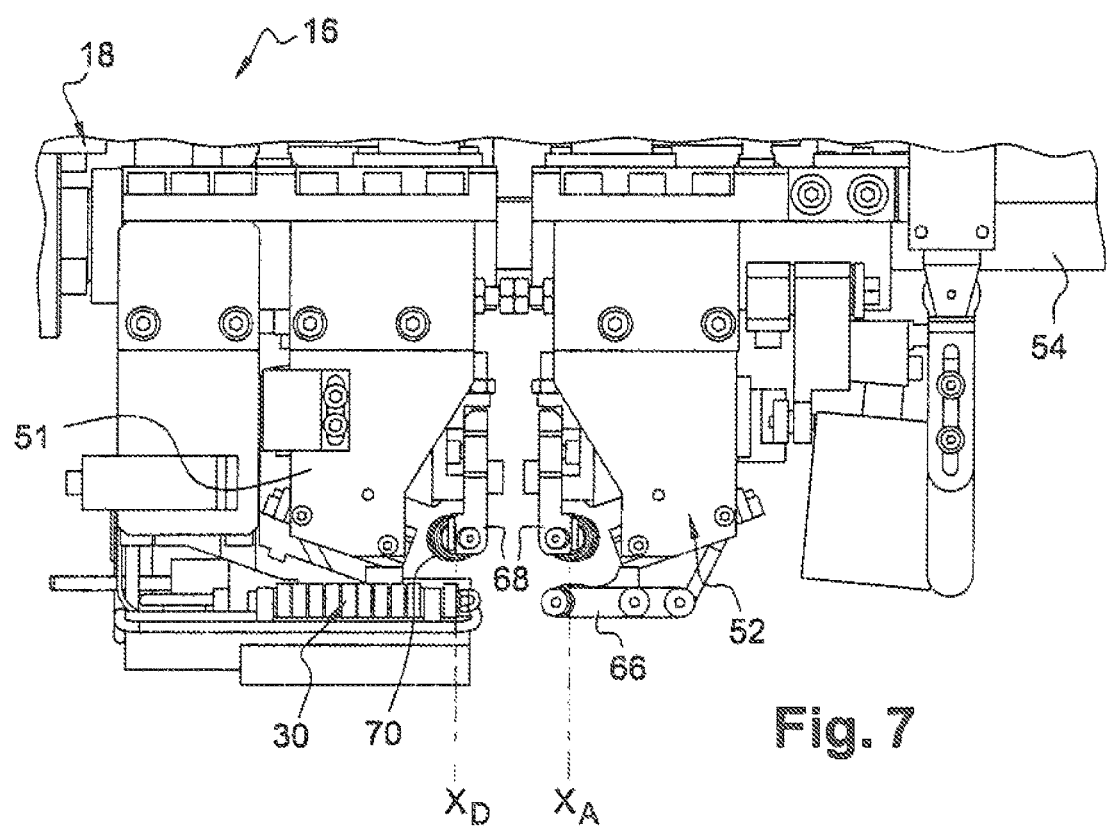
FIG. 7 is a view in elevation of the device depicted in FIG. 4.

With reference to FIGS. 4 and 7, the device 16 in addition comprises two closure or assembly members 51 and 52. Each of them is mounted in such a way as to slide in relation to the frame 18 in the direction X. In the present case, the two members are movably mounted in a sliding manner on a common shaft 54 parallel to the direction X and which acts as a support and a guide for them. The device 16 in addition comprises a slider 56 mounted in such a way that it is able to move by sliding on a shaft 58, which shaft is also parallel to the direction X. The slider is rigidly attached to the member 51 in such a way as to prevent it from rotating in relation to the frame. Similarly, a slider 60 is mounted in such a way that it is able to move by sliding on a shaft 62 that is separate from the shafts 54 and 58 and parallel to the latter, in order to prevent the member 52 from rotating. The device 16 comprises means for driving the slider 56 on the shaft 58, which means permit the member 51 to be displaced in relation to the direction X, as well as means for driving the slider 60 on the shaft 62, which means permit the member 52 to be displaced in relation to the direction X. The means for driving the two members are independent, as are the latter.

The member 51, as illustrated in particular in FIGS. 4 and 28, comprises a frame 64 and a plate 66 having a flat form generally parallel with the directions X and Y and rigidly secured to the frame 64. The plate exhibits a set of teeth 69 on its upper surface, of which the teeth are profiled in the direction Y, the plate thus forming a lower jaw. The member 51 comprises an upper jaw 67 mounted in such a way that it is capable of movement by sliding vertically in relation to the plate and is provided with a similar set of teeth on its lower surface. These two jaws 66 and 67, which are able to come into mutual contact, thus form a clamp.

The member 51 in addition comprises a calliper 68 mounted in such a way as to slide in the direction Z in relation to the frame 64. A lower end of the calliper 68 extends with regard to a front end of the plate 66. Each of these ends carries one pair of ribbed rollers 70.

With reference to FIGS. 6 and 29 to 34, the member 52 exhibits a configuration similar to that of the member 51, with the exception that its set of teeth and its upper jaw are absent. The frame 64, the plate 66, the calliper 68 and the ribbed rollers 70 are present here, therefore.

Figure 27:
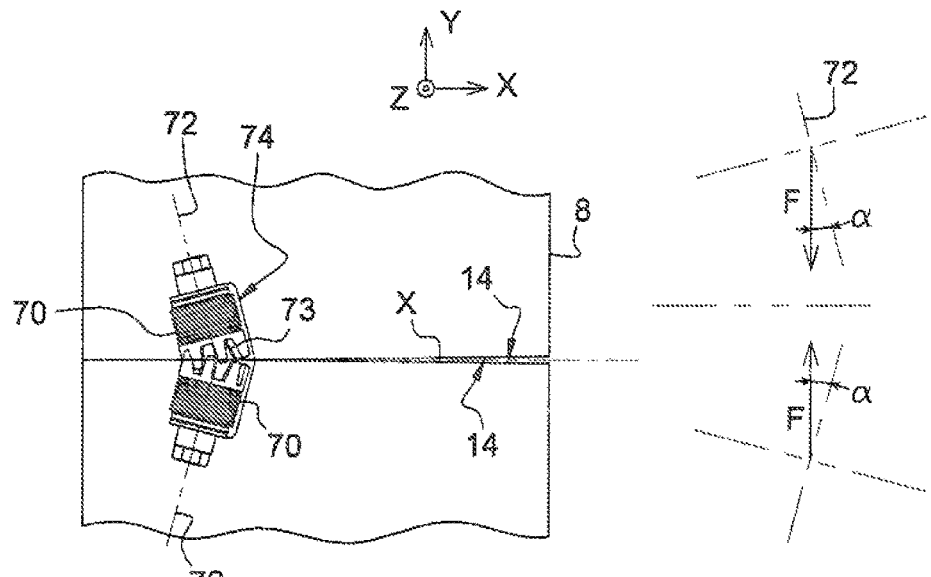

In each member, the ribbed rollers are arranged as illustrated in particular in FIG. 27. In each pair, the ribbed rollers are symmetrical with one another in relation to a vertical plane and are parallel to the axes X and Z. In the present case, the ribbed rollers of the upper pair are larger than the ribbed rollers of the lower pair. They are each mounted loosely about their respective axes of rotation 72. The two axes 72 of the ribbed rollers of each pair are intersecting in the general plane of symmetry of the member. In addition, these two axes 72 extend in a single common horizontal plane parallel to a plane tangent to the drum. Each axis 72 forms an angle α with the horizontal direction Y. The axes 72 of the lower ribbed rollers are parallel to the respective axes of the upper ribbed rollers. In each pair, the ends of the ribbed rollers situated with regard to one another form a dog clutch 73 exhibiting teeth, by means of which the ribbed rollers are in mutual engagement in such a way that the ribbed rollers of each pair are fixed in rotation, although these rotations take place about different axes.

Each of the ribbed rollers exhibits on its circumferential surface a set of teeth of which the teeth succeed one another in the direction parallel to the axis 72. Each tooth is profiled in the circumferential direction of the ribbed roller. The teeth have a triangular profile. The teeth are all mutually identical and are separated from one another by equal distances.

Unlike the member 51, the member 52, which is situated ahead of the preceding member with reference to the positive direction of the axis X, carries on the side of its front end magnets 74 extending with regard to the frame. The magnets are each oriented in such a way that their north-south axis is vertical or substantially vertical. They are arranged side-by-side and succeed one another in the direction Y.

Each magnet is mounted, via its upper end, in such a way that it is able to move in relation to the frame 64 as it rotates about a horizontal axis 76 parallel to the direction X thanks to an arm 78. The two axes 76 of the magnets extending to the same height with reference to the axis Z. Each arm 78 carries a wheel 80 mounted to rotate freely on the arm about an axis 82 parallel to the direction X.

The member 52 comprises a trapezoidal cam 84 mounted in a sliding manner in the direction Z in relation to the frame 64. This cam exhibits two lateral ramps 85 forming two symmetrically opposing sides of the trapezium, the ramps forming surfaces parallel to the direction Y and inclined in relation to the directions X and Z. The wheels 80 roll on the respective ramps during the sliding of the cam. The member 52 comprises means, which are not illustrated in detail here, for the guiding and driving of the cam in relation to the frame.

When the cam occupies a raised position in relation to the frame, as illustrated in FIGS. 29 to 31, the wheels extend in the lower part of the ramps 85, close to the base of the trapezium, which forms the longer of the two parallel sides. Since the two wheels 80 extend from the same side of the axes 82 as the magnets 74, the position is one in which the magnets are moved away from one another, their north-south axis being inclined in relation to the direction Z.

Figure 32:
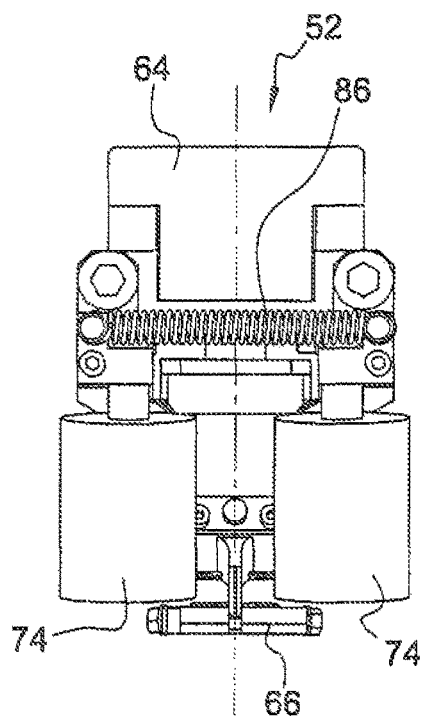
FIGS. 32 to 34 are similar views to those depicted in FIGS. 29 to 31 showing the member in a second state.
Figure 33:
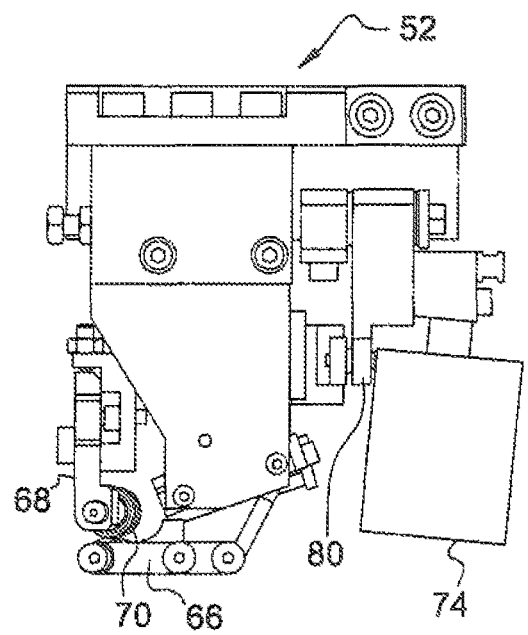
Figure 34:
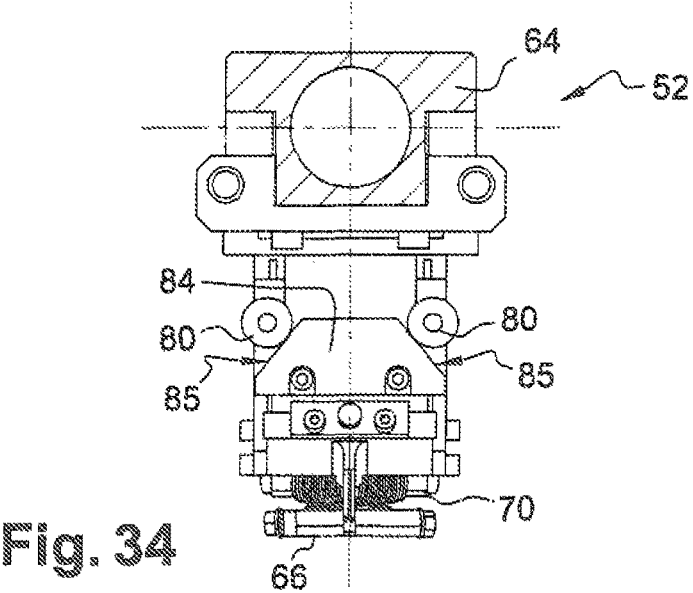

In the configuration depicted in FIGS. 32 to 34, the cam 84 extends in the lowered position, as a result of which the wheels 80 in the upper part of the ramps 85 are relatively close to one another. The same applies to the magnets, of which the north-south axes are vertical on this occasion.

The member 52 comprises a return element 86, such as a spring, of which the respective ends are fixed to the arm 78 and which permits the wheels 80 to be maintained resting on the ramps 85. The control of the movement of the cam thus permits that of the magnets to be controlled.

The member 52 comprises a mechanism for the coordination of the movements of the cam 84 and of the sole plate 66, so that the cam 84 is in a raised position when the sole plate is in a lowered position, as illustrated in FIGS. 29 to 31, whereas the cam is in a lowered position when the sole plate is in a raised position, as illustrated in FIGS. 32 to 34.

Figure 6:
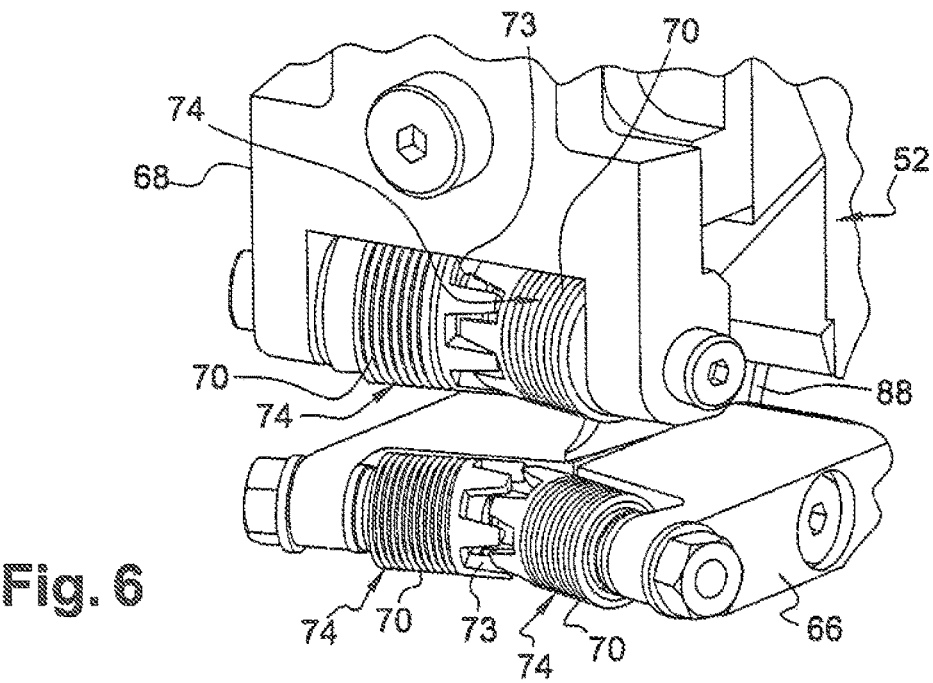
Figure 24:
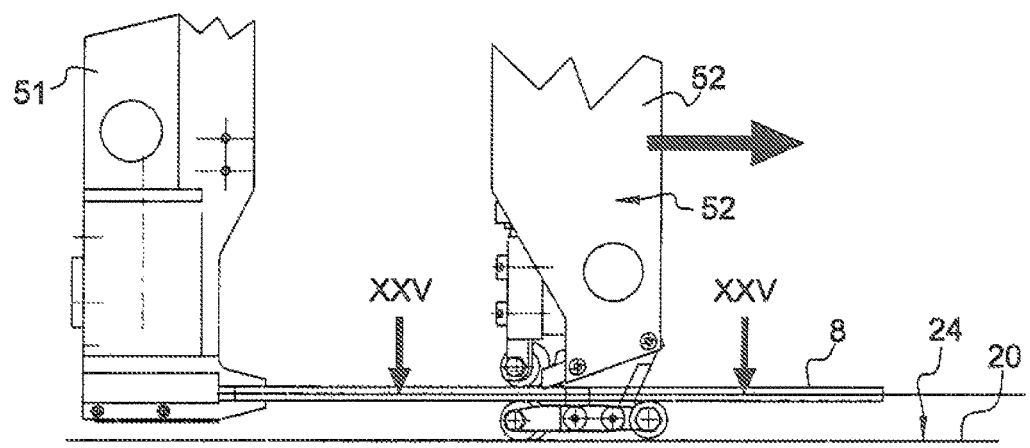
FIGS. 24 to 27 are views of the device respectively in elevation and in cross-section in the plane XXV-XXV, and in plan, illustrating another stage in the method.
Figure 25:
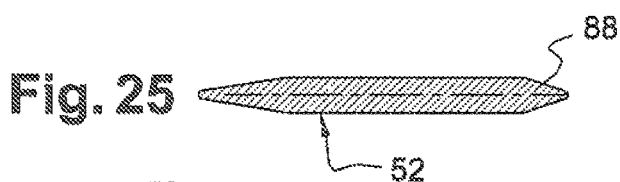

As illustrated in FIGS. 6, 24 and 25, each member 51, 52 comprises a stem 88, which is visible in a horizontal section in FIG. 25 and which attaches the plate 66 to the frame 64. This stem exhibits a horizontal section of streamlined shape.

The means of control 17 for the device 16 control its operation in such a way as to implement the following stages of the method.

Figure 17:
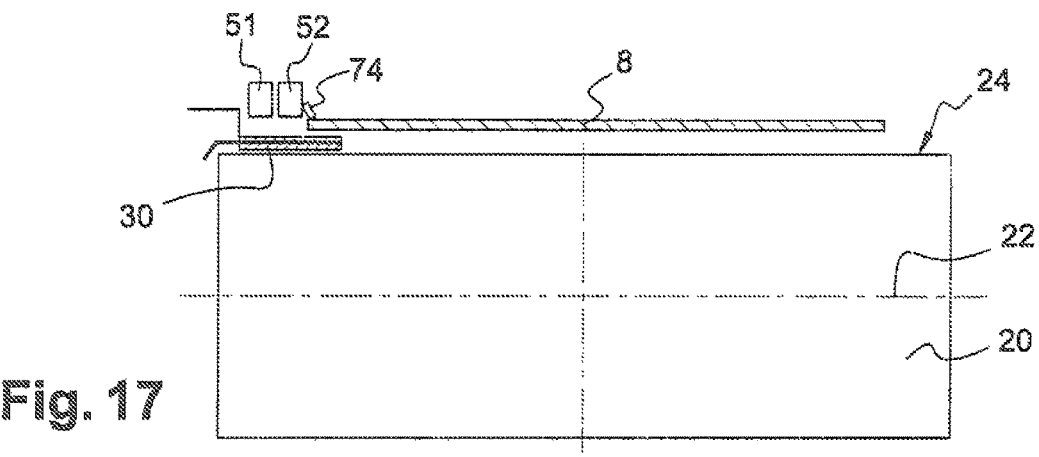
FIGS. 17 to 22 illustrate several successive stages in the implementation of the method.

In the context of the configuration depicted in FIGS. 15 and 16, the blade 30 is interposed radially between the ply and the drum. The members 51 and 52 extend at this stage, as illustrated in FIG. 17, in the same vertical plane as the blade, but to the rear of the latter with reference to the positive direction of the axis X. In the member 51, the plate is lowered while the calliper is raised, as depicted in the left-hand part of the FIG. 28. The magnets of the member 52 are in their closed-up position, as depicted in FIGS. 32 to 34. This is the position in which their lower end is closest to the drum.

Figure 18:
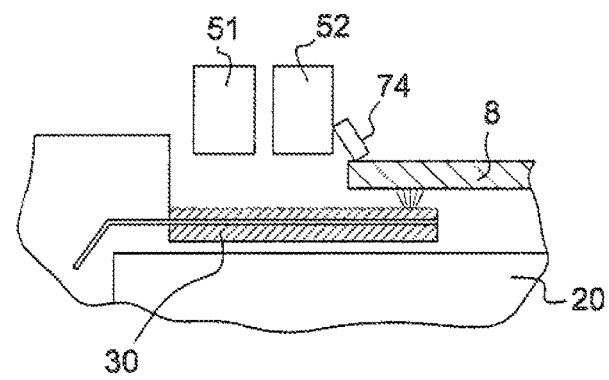
Figure 19:
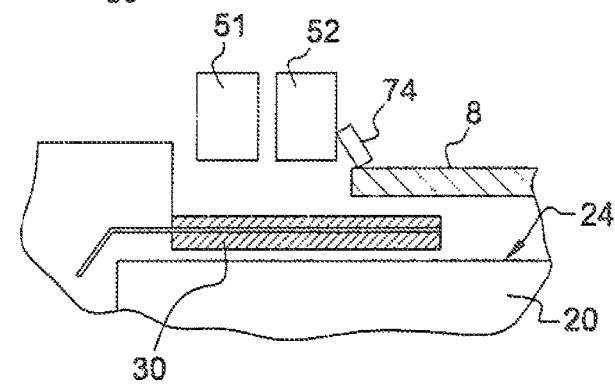

The means 17 control the supply of compressed air to the two orifices 48, 50 in order to raise the ends of the ply and to distance it from the blade. This is the stage illustrated in FIG. 18. Thus, these ends are closer to the magnets 74. At the same time, the means 17 control the supply of current to the electromagnets so that, under the effect of the magnetic attraction exerted on the strands 10, the ends of the ply come into contact with the lower ends of the magnets. Once this contact has been established, these ends are maintained in this position in which they are distant in relation to the blade, and the means 17 interrupt the supply of air to the orifices, as illustrated in FIG. 19.

In such a configuration, if the member 52 is displaced in the direction X, the lower end of the magnets risks rubbing against the ply. This is why, as shown by FIGS. 29 to 31, the passage of the member 52 is controlled in the other configuration, where the magnets are distant from one another, with the plate lowered, in order to keep the two ends of the ply apart and to permit the engagement of the ply in the member 52.

Figure 20:
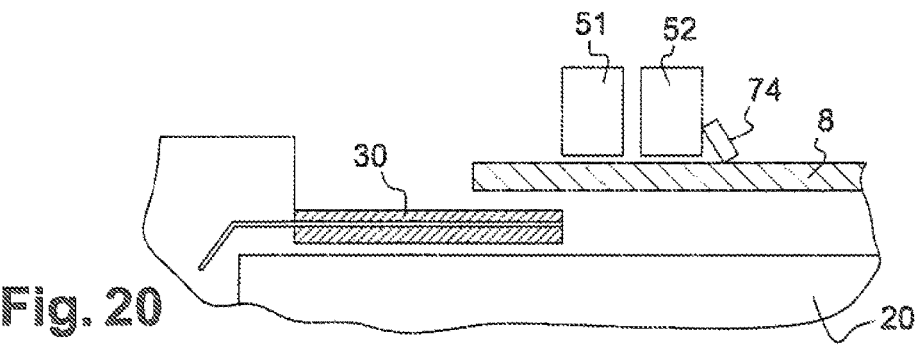
Figure 21:
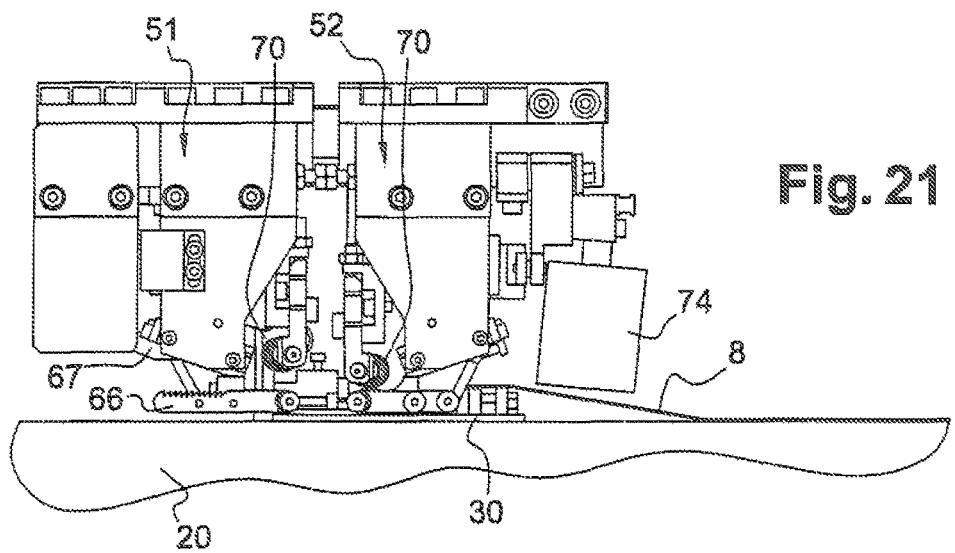
Figure 22:
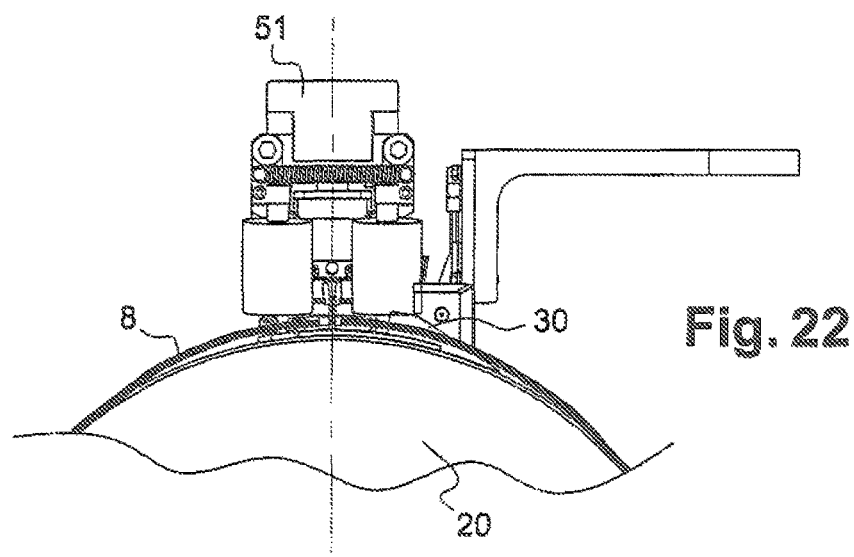

The plates of the two members are both in a lowered position, the means 17 control the sliding of the members 51, 52 towards the front in the direction X without displacing the blade as illustrated in FIG. 20. The plates 66 pass into the throat 44 between the supports 40 and 42 and below the ends 14 of the ply, while the frame 64 passes above these ends. The sliding continues as far as necessary in order to cause the members 52 and 51 to adopt the respective positions XA and XD illustrated in FIG. 23. The positions in question are two median positions, that is to say they are distant from the lateral edges 90, 92 of the ply. The position XA is closer to the distal edge 90 of the ply than the position XD.

The retraction of the blade 30 is then controlled, in the negative direction of the axis X, in order to place it in a storage position or a parked position in which it is distant from the drum and from the ply. It is now the plates and the magnets which maintain the ends of the ply locally distant from the drum.

The descent of the jaw 67 of the rear member 51 is then controlled. The ends of the ply are accordingly immobilized locally in the clamp formed between the two teeth 69, as depicted in the central part of FIG. 28. At the same time, the descent of the calliper of the front member 52 is controlled in order to sandwich the ply between the two pairs of ribbed rollers.

A start is then made on the butt-jointing, that is to say the assembly of the two ends of the ply to one another, with the member 52. In order to do this, in a first phase illustrated in FIG. 23, the single front member 52 is displaced towards the front, in the positive direction of the axis X, from the position XA to a median position XB extending between the position XA and the distal edge 90. During this displacement, the drum as well as the member 51 hold the largest part of the ply stationary in position, as illustrated in FIGS. 24 and 25.

Figure 26:
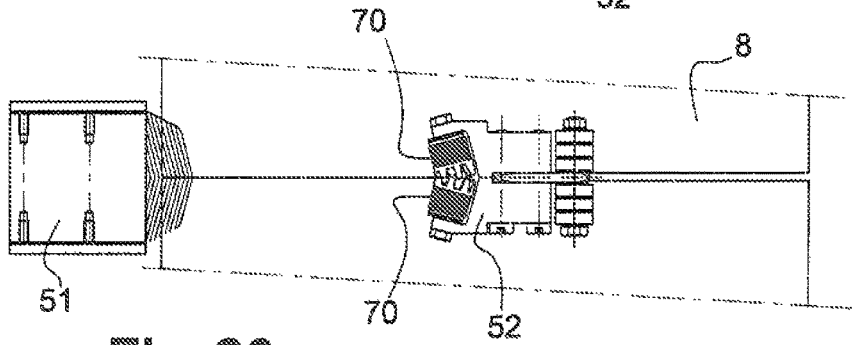

In the course of this movement, butt-jointing proceeds as follows with reference to FIGS. 26 and 27. The teeth of each of the four ribbed rollers of the member 52 penetrate by a few tenths of a millimeter into the elastomer matrix of two zones of the ends of the ply, in its lower and upper surfaces. The sliding of the member 52 in relation to the ply in the direction X causes the ribbed rollers to rotate by friction about their respective axes. However, because of the inclination of the axes 72 in relation to the path of the member 52, the teeth move the two end regions of the ply closer together in such a way as to bring them into mutual contact and to press them against one another. In the course of the movement of the ribbed roller on the ply, its set of teeth exert a force F perpendicular to the direction X and to the direction of the strands. The forces are exerted by the ribbed rollers of each pair on the respective ends in opposite directions, in order to move them together. In view of the plastic state of the rubber, this contact is sufficient to ensure the welding of the rubber to itself. In addition, the axial ends of ribbed rollers forming the dog clutch come into contact with the abutted ends in order to carry out a lamination of the ply improving the welding of the two ends.

In the event that the two ends of the ply are superimposed on one another before the passage of the member 52, the stem 86 will separate them. Downstream of the latter, the two ribbed rollers then assure their butt-jointing, as indicated above.

In other words, when the member 51 retains a part of the ends of the ply, the member 52 advancing in the axis X positions another section of the ends end-to-end and, by the application of forces to these in the opposite direction, brings about their welding.

Figure 23:
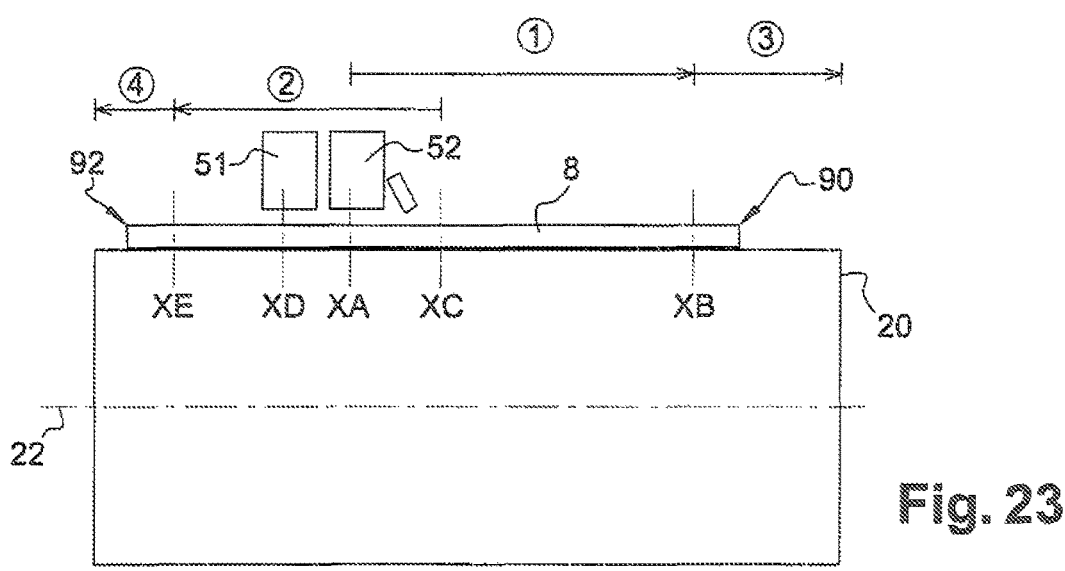
FIG. 23 illustrates the paths of the assembly members in the method.

With reference to FIG. 23, the member 52 stops once it has arrived in position XB. Position XB extends, for example, as far as a point 10 mm from the distal edge.

The raising of the upper jaw from the rear member 51 is controlled, and then the displacement of the member 51 towards the front from position XD towards a position XC situated between positions XA and XB. In the course of this path, the member 51 does not assemble the ends of the ply.

The lowering of the calliper 68 from the rear member 51, and then its retraction as far as a median position XE situated between position XD and the proximal edge 92 of the ply, on the path 2, is then controlled. In the course of this movement, the front member 52 is stationary on this occasion in relation to the ply in order to maintain it in position between the two pairs of ribbed rollers, while the member 51 ensures the welding of the two ends on the part of its path where they have not been placed end-to-end.

Without stopping in the position XE, the member 51 continues its retraction as far as the proximal end edge 92 on the part 4 of the path. When the member 51 passes the position XE, the member 52 resumes its movement towards the front in order to bring about the closure of the ply from the position XB as far as the distal edge 90 on the path 3. The paths 3 and 4 of the members 51 and 52 thus occur simultaneously in the present case. Alternatively, it is also possible to cause the member 51 to stop in the position XE, in order to ensure that the two members 51 and 52 restart properly in a totally synchronous manner, and that they release the carcass ply exactly at the same moment.

The ends of the ply have thus been positioned entirely end-to-end. The two members 51 and 52 are no longer opposite the ply. It is now possible to reset the whole of the device used to provide the butt-joint, if means for this purpose are provided, and to remove the ply from the drum.

The ply and the other constituent parts of the tire are then assembled in order to form an uncured tire blank. On completion, the latter is the subject of curing in a press with a view to the vulcanisation of the rubber.

The control means are electronic means comprising one or a plurality computers equipped with processors, memories, etc. They contain one or several programmes in registered form comprising coded instructions capable of controlling the execution of all or part of the method according to the invention when it is executed on the computer.

It is, of course, possible to undertake numerous modifications to the invention without departing from the scope of the invention.

It is possible for the line separating the two ends to be inclined in relation to the direction X, like the threads 10. Provision can be made for this inclination to be measured by suitable means, such as cells or a camera 95, which are capable of measuring the radiality of the ply in relation to the belt 28, that is to say the orientation of the threads 10 of the ply in relation to its direction of travel on the said belt. Provision can be made, prior to the sequence of butt-jointing, for the device to modify its angular orientation in order to compensate for all or part of this difference. This rotation is carried out, for example, when the two members are respectively in positions XA and XD.

It is also possible to make provision for one degree of freedom in rotation to be provided for the members 51 and 52 about the axis defined by the lower shaft 54. It is thus possible to maintain contact by each of these members with the drum during butt-jointing, which ensures their accurate positioning. A hyperstatic configuration is avoided in this way. The upper shaft 62 is made flexible in such a case.

The sequence of butt-jointing may take place differently with a different order or a different number of paths for the members 51, 52. It is possible to utilize only one of these members.

A method for producing a carcass ply for a vehicle tire, involving the ply being wound onto a drum and containing reinforcements running in planes that are radial to an axis of the drum, can be implemented independently of the blade, the method being of a kind in which at least one assembly member, which is mounted in such a way that it is able move in relation to the drum, brings the ends of the ply together and assembles them by travelling over the ply in a direction parallel to the ends, with or without all of its other optional characterizing features.

The invention claimed is:

1. A method for producing a carcass ply for a vehicle tire comprising:
    winding a ply onto a drum, the ply containing reinforcements extending in planes that extend longitudinally with respect to the drum, the reinforcements being located around a centerline longitudinal axis of the drum,
    mounting at least one assembly member in a way such that it is able to move in relation to the drum, and such that is able to, while it travels over the ply in a direction parallel to ends of the ply which face each other, bring the ends of the ply which face each other together and assemble them together, wherein the assembling together of the ply ends is butt-jointing the ends,
    prior to the step of winding the ply onto the drum, extending a blade that is able to move in relation to the drum independently of the one or of each assembly member in a position such that, after winding the ply onto the drum and the blade, the blade extends between the drum and the ends without extending between the drum and the rest of the ply, and
    the state in which the blade extends between the drum and the ends is achieved by passing one of the ends of the ply over the blade and then into contact with the surface of the drum in such a way that the ply is wound onto the drum as the drum rotates, and using the rotation of the drum to bring the one end of the ply into contact with the blade so that the blade is inserted between the drum and the one end of the ply, causing the one end of the ply to rise on the blade.

2. The method according to claim 1, wherein the blade is arranged on the drum.

3. The method according to claim 1, wherein the blade is introduced in a direction circumferential to the axis of the drum between the drum and the one end of the ply wound onto the drum.

4. The method according to claim 1, wherein the ends are moved away from the drum as well as the blade, in a direction radial to the axis of the drum, separate from the one or from each assembly member.

5. The method according to claim 1, wherein the ends are retained at a distance from the drum, in a direction radial to the axis of the drum, separate from the one or from each assembly member.

6. The method according to claim 5, wherein the step of retaining the ends at the distance is achieved by at least one magnet.

7. The method according to claim 1, wherein the at least one assembly member comprises a first assembly member as well as a second assembly member, the second assembly member being held stationary in relation to the drum and retaining the ply while the first assembly member moves over the ends of the ply.

\* \* \* \* \*